(12) United States Patent
Galipeau et al.

(10) Patent No.: US 8,176,276 B2
(45) Date of Patent: *May 8, 2012

(54) TECHNIQUES FOR PRODUCING A CONSISTENT COPY OF SOURCE DATA AT A TARGET LOCATION

(75) Inventors: Kenneth J. Galipeau, Rockaway, NJ (US); Robert K. Kast, Succasunna, NJ (US); Eran Orgad, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/209,533

(22) Filed: Aug. 15, 2011

(65) Prior Publication Data

US 2011/0295812 A1    Dec. 1, 2011

Related U.S. Application Data

(63) Continuation of application No. 11/981,845, filed on Oct. 31, 2007, now Pat. No. 8,024,535, which is a continuation of application No. 11/072,128, filed on Mar. 4, 2005, now Pat. No. 7,310,716.

(51) Int. Cl.
*G06F 12/00* (2006.01)
(52) U.S. Cl. .................................................. 711/162
(58) Field of Classification Search ................ None
See application file for complete search history.

(56) References Cited

U.S. PATENT DOCUMENTS

| | | | |
|---|---|---|---|
| 6,389,459 B1 * | 5/2002 | McDowell | 709/216 |
| 6,553,392 B1 * | 4/2003 | Mosher et al. | 707/648 |
| 6,611,901 B1 * | 8/2003 | Micka et al. | 711/162 |
| 7,055,009 B2 * | 5/2006 | Factor et al. | 711/162 |
| 7,310,716 B2 * | 12/2007 | Galipeau et al. | 711/162 |
| 7,720,801 B2 * | 5/2010 | Chen | 707/613 |
| 7,724,599 B2 * | 5/2010 | Arakawa et al. | 365/222 |
| 8,005,795 B2 * | 8/2011 | Galipeau et al. | 707/648 |
| 2003/0149736 A1 * | 8/2003 | Berkowitz et al. | 709/213 |
| 2005/0021567 A1 * | 1/2005 | Holenstein et al. | 707/200 |
| 2006/0173935 A1 * | 8/2006 | Merchant et al. | 707/204 |

* cited by examiner

*Primary Examiner* — Hiep Nguyen
(74) *Attorney, Agent, or Firm* — Muirhead and Saturnelli, LLC

(57) ABSTRACT

Described area system and computer program product for producing a point in time copy of source data. A set of records corresponding to a time ordered series of recorded file operations as applied to said source data is received. The set of records includes one or more consistency point markers, each consistency point marker indicating a point in time at which said source data is in a consistent state when a portion of said recorded file operations occurring up to said point in time is applied to said source data. The recorded file operations corresponding to said set of records are applied to said copy of the source data until a marker record corresponding to a consistency point marker is determined. Also described is a target system for producing a point in time copy of source data including a data storage device including said copy of source data and a replication service.

16 Claims, 14 Drawing Sheets

| |
|---|
| Pause forwarding flag 404 |
| Pause update flag 406 |
| Identifier for source script 408 |
| Identifier for target script 410 |
| Other data 412 |

TECHNIQUES FOR PRODUCING A CONSISTENT COPY OF SOURCE DATA AT A TARGET LOCATION

RELATED APPLICATIONS

This application is a continuation of U.S. patent application Ser. No. 11/981,845, filed on Oct. 31, 2007, now U.S. Pat. No. 8,024,535 entitled TECHNIQUES FOR PRODUCING A CONSISTENT COPY OF SOURCE DATA AT A TARGET LOCATION, which is a continuation of U.S. patent application Ser. No. 11/072,128 (now issued U.S. Pat. No. 7,310,716), filed on Mar. 4, 2005, entitled TECHNIQUES FOR PRODUCING A CONSISTENT COPY OF SOURCE DATA AT A TARGET LOCATION, all of which are incorporated by reference herein in their entirety.

BACKGROUND

1. Technical Field

This application generally relates to a data storage system, and more particularly to techniques using consistency points and associated consistent copies of data in a data storage system.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

Different tasks may be performed in connection with a data storage system. For example, processing may be performed in a data storage system for creating and maintaining a mirror copy of data from a source system at a target system. As file operations are performed which cause a data modification to the source system, the modifications may be recorded and then applied to the target system's copy of the data. In connection with performing data operations, it may be desirable to utilize a copy of the data on the target system when the data is in a consistent state. The source or target system may be characterized as being in a consistent state at a point in time, for example, when all outstanding database transactions are committed, any new incoming transactions are placed on hold or "queued", and any database buffers are flushed with respect to the selected point in time. However, it may be difficult to establish and determine when the copy of the data on the target system is in such a consistent state.

Thus, it may be desirable to have an efficient technique for providing a consistent copy of data on the target system and for determining when the copy of the data on the target system is in a consistent state while minimizing any negative impact on the data of the source system and applications accessing the data on the source system.

BRIEF DESCRIPTION OF THE DRAWINGS

Features and advantages of the present invention will become more apparent from the following detailed description of exemplary embodiments thereof taken in conjunction with the accompanying drawings in which:

FIG. 7 is an example of elements that may be included in a consistency point marker record;

DETAILED DESCRIPTION OF EMBODIMENT(S)

Figure 1:
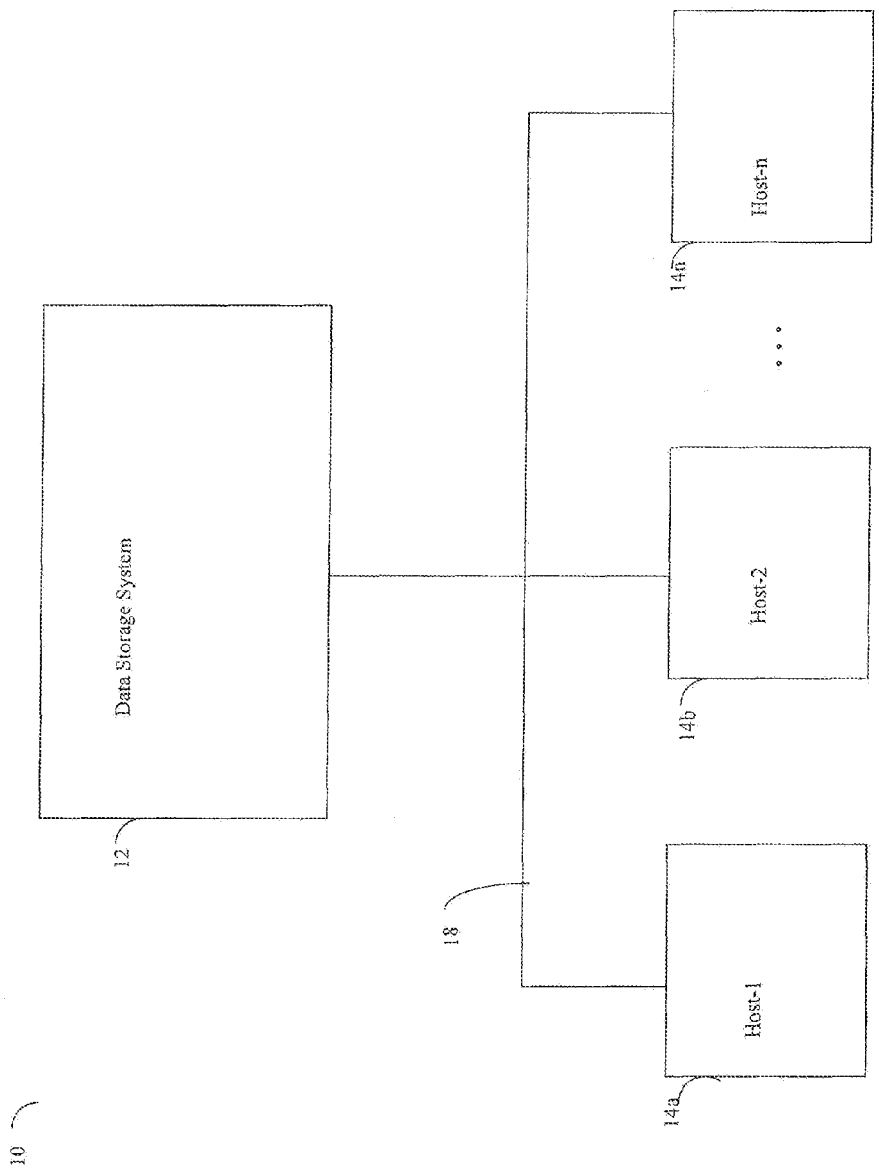
FIG. 1 is an example of an embodiment of a computer system that may utilize the techniques described herein.

Referring now to FIG. 1, shown is an example of an embodiment of a computer system that may be used in connection with performing the techniques described herein. The computer system 10 includes a data storage system 12 connected to host systems 14a-14n through communication medium 18. In this embodiment of the computer system 10, and the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, fabric, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intelbased processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, iSCSI, and the like. Some or all of the connections by which the hosts, management component(s), and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
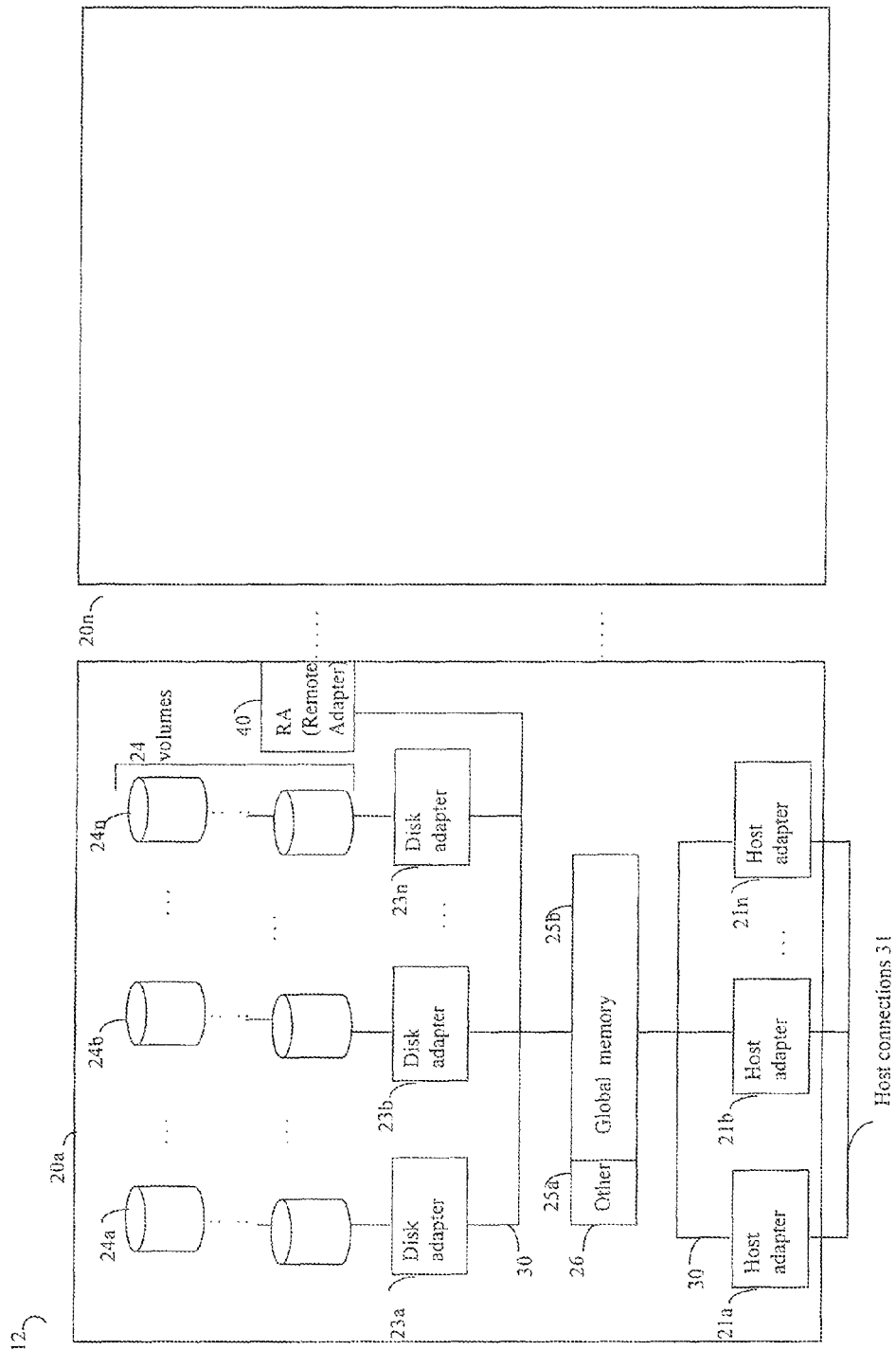
FIG. 2A is an example of an embodiment of a data storage system.

Referring now to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on an LV may be accessed by the DA following a data request in connection with I/O operations that other directors originate.

Figure 2B:
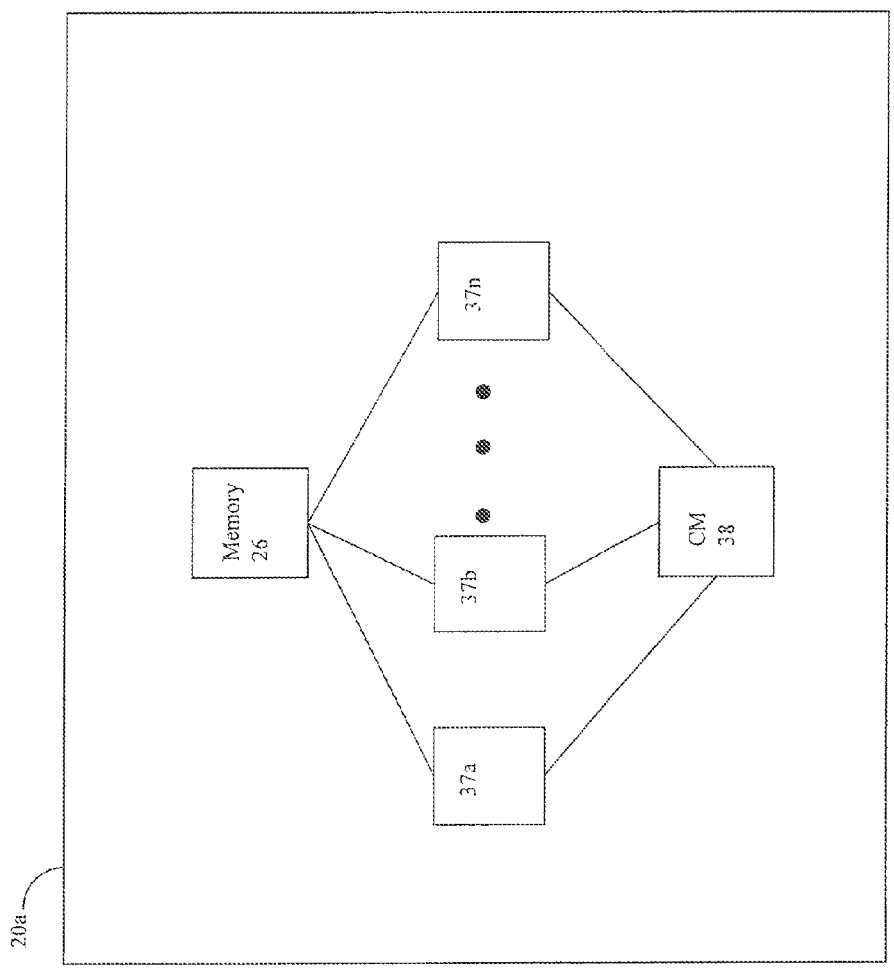
FIG. 2B is a representation of the logical internal communications between the directors and memory included in one embodiment of data storage system of FIG. 2A.

Referring now to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

Figure 3:
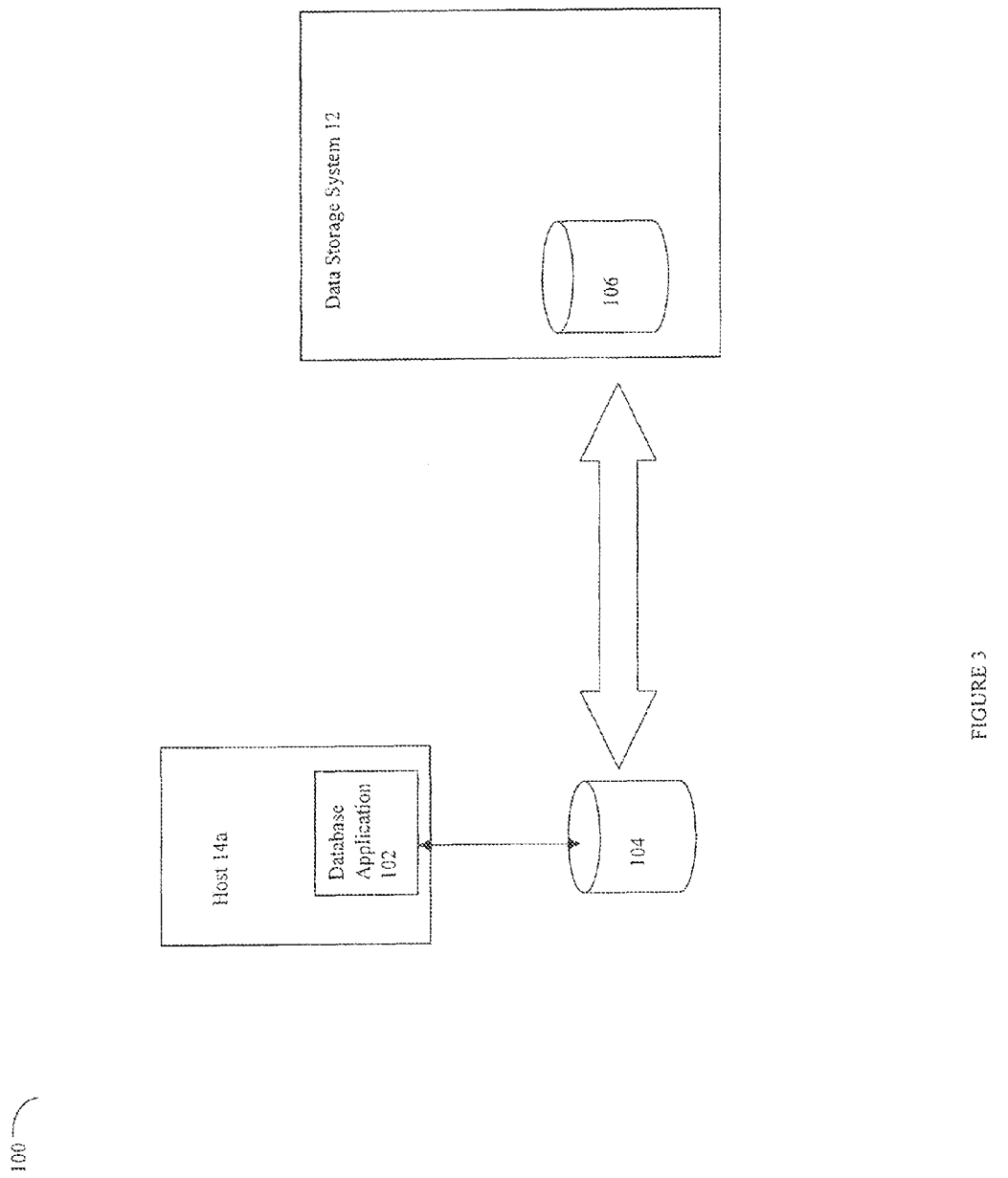
FIG. 3 is an example of components that may be used in connection with performing techniques herein for obtaining a consistent copy of data on a target.

Referring now to FIG. 3, shown is an example of components of the system 10 that may be used in connection with performing techniques described herein. The example 100 includes a host 14a and a data storage system 12 as previously described in connection with other figures. The host 14a includes a database application 102 executing thereon. The database application 102 may read and write data, for example, from a data storage device 104 which may be local to the host 14a. In connection with performing some operations such as, for example, a backup operation, data from a device local to a host, such as device 104, may be copied to another central location, such as a device 106 on data storage system 12. Device 106 of data storage system 12 may then be backed up onto other data storage devices. The database application 10 may perform file-based commands, such as file operations to read, write, truncate, and the like, in connection with operating on files included in the device 104. The backup operation may also be performed on data at the file system level where the specified elements to be backed up are, for example, particular files, directories, and the like, in accordance with the file system and structure of a particular embodiment. The data which is the subject of the backup operation may be a portion of data included in a device 106.

As part of obtaining and maintaining a copy of source data from a source device, such as 104, an initial synchronization operation may be performed. The synchronization operation may initially copy files of the source data to a target, such as target data included in device 106. After synchronization, both the source and target data copies are the same. Subsequent updates or modifications to the source data can then be asynchronously replicated on the target data by mirroring file operations performed on the source data. In other words, if a particular file operation results in a modification or change to the source data, this file operation may be recorded and then also applied to the target data. When performing a backup operation upon the target data, the target data may be characterized as a consistent copy of the source data at a point in time. As described herein, a copy of the source data is in a consistent state at a point in time, for example, when all outstanding database transactions are committed, any new incoming transactions are placed on hold or "queued", and any database buffers or other cached data are flushed with respect to the selected point in time.

What will be described herein are techniques that may be used in connection with obtaining a consistent copy of the source data from device 104 on a target such as device 106 of the data storage system 12. The target data, at a point in time when it is a consistent copy of the source data, may then be used in connection with performing other operations and tasks such as, for example, a backup operation.

Although the example 100 illustrates only a single host 14a, it should be noted that any one of the other hosts included in the system 10 may also be used in connection with the techniques described herein. The host 14a, the particular application such as the database application 102, and the use of the target data included on storage device 106 in connection with performing a backup operation are selected for the purposes of illustrating the techniques described herein. Other applications besides database applications may be used in connection with performing operations on a source data device being replicated to a target data storage device. Additionally, the target data storage device may be used in connection with any one of a variety of different operations besides a backup operation.

The components included in FIG. 3 may only represent a portion of those actually included in an embodiment. The particular ones of FIG. 3 have been included for the purposes of illustration and example. Various configurations are described elsewhere herein. For example, one embodiment may use host-to-host communications, data storage system-to-host, or data storage system-to-data storage system communications in connection with implementing the techniques described herein.

In following paragraphs, what will first be described are techniques that may be used in replicating the source data on a target. Subsequently what will be described are additional elements to the replicating technique to facilitate determination of when the target data may be characterized as a consistent copy of the source data.

What will now be described are techniques that may be used in connection with replicating source data, such as data from source device 104, to a target device, such as device 106. The replication techniques described herein may be performed at the file system level in accordance with file system level commands. In accordance with one technique that will be described in connection with FIG. 4, various file system level commands may be captured and stored as file operations are applied, in real time, to the source device 104. As these file operations are captured and recorded in a queue or storage location on a source system, such as the host 14a, the captured operations may be forwarded to a target system or server for application to target data included in a target device 106.

It should be noted that although a particular replication technique using asynchronous replication is described in more detail herein, it should be noted that the techniques described herein may be used in connection with other replication techniques known to those of ordinary skill in the art such as, for example, various modes of synchronous replication.

Figure 4:
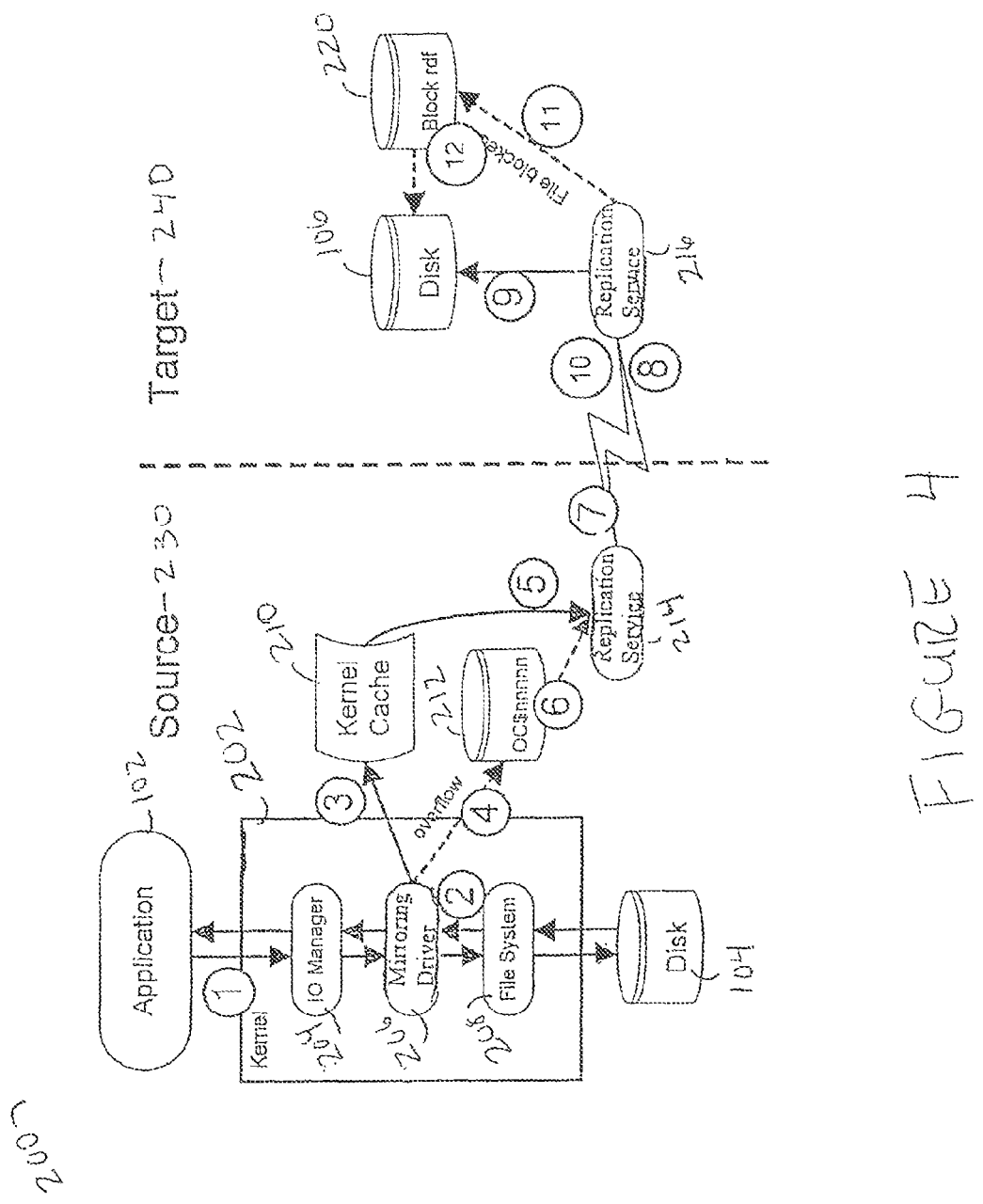
FIG. 4 is an example of components that may be used in connection with real-time replication of file operations in order to maintain a mirror copy of source data.

Referring now to FIG. 4, shown is an example 200 of components that may be used in connection with real-time replication of file operations in order to maintain a mirror copy of source data included in a source device 104 on a target device 106. Included in the example 200 are a source system 230 and a target system 240. The source system 230 may be, for example, the host 14a as previously illustrated in connection with FIG. 3. The target system 240 may be, for example, a server included in, or connected to, the data storage system 12. The application 102 may perform file operations such as, for example, file write operations or other operations causing modification to the source data. During execution of the application 102, these file operations issued by the application 102 (step 1) may be captured using one or more components. Some of the components execute in kernel space 202. Components executing in kernel space 202 may include the I/O manager 204, a mirroring driver 206, and the file system 208. It should be noted that an embodiment may include other components than as illustrated in connection with this example. For example, an embodiment may include one or more other drivers below the file system 208 in connection with interfacing with the disk or other device 104. The mirroring driver 206 may be characterized as a filter driver which captures file operations of interest on the way back up the call chain (step 2) and records the file operations of interest in the kernel cache 210 (step 3). In the event that the kernel cache 210 is full or otherwise overflows, the mirroring driver 206 may record the data operation captured in an overflow location 212 (step 4). A consumer or reader of the capture data operations included in the kernel cache and/or overflow location 212 is the replication service 214, a user-mode process. The replication service 214 reads the captured data operations from the kernel cache 210 (step 5) and the overflow location 212 (step 6). It should be noted that the mirroring driver 206 continues to write to the overflow location 212 until the replication service processes a sufficient amount of captured file operations from the kernel cache. When this occurs, the mirroring driver may then resume writing to the kernel cache 210. When the mirroring driver queues a kernel operation as in the kernel cache 210 or overflow location 212, the replication service 214 then reads the file operation from either the kernel cache or the overflow location 212. The replication service 214 transmits the file operation (step 7) as read from 210 and/or 212 to the appropriate target system such as server 240. Code located on the target server may include, for example, replication service 216 which processes the received file operations (step 8) as transmitted from service 214 of the source system 230. The replication service 216 on the target may then proceed to apply the received file operations (step 9) to the files of the target data included in the target storage device 106 and send an acknowledgment back to the source system (step 10). It should be noted that in the event that the replication service 216 is blocked from performing or applying a file operation, the file operation may be recorded in a blocked data container 220 (step 11). It should be noted that applying a file operation to a file may be blocked, for example, if a disk is full, a file is in use, and the like. Once a file is labeled as having operations blocked, all subsequent file operations to that particular file may then be saved in the blocked data container 220 until the file is otherwise associated with a state of unblocked file operations. Periodically, the replication service 216 may attempt to reapply the file operations as included in the blocked data container 220 (step 12).

As just described, mirroring may be characterized as the real time mirroring of a file operation applied to the source data. The mirroring may be facilitated, for example, using the mirroring driver 206 and the service 214. Mirroring may be triggered by a file operation of an application such as a database application 102. The application may also be, for example, any other user-mode process such Microsoft Word. The file operation may also be caused by a remote client computer attached to the source for example through a mapped drive. The operations just described in connection with the example 200 of the FIG. 4 may be characterized as having three distinct phases including mirroring in which the file operations are captured in the kernel and queued to be sent to a target. A second phase may be characterized as forwarding in which the file operations are forwarded from the source to the target. A third phase may be characterized as updating in which the file operations are applied to the target data. It should be noted that the source system 230 and target system 240 may be located within the same or different computer systems. In other words, 230 may be included in a first computer system and 240 may be included in a second different computer system. Alternatively elements 230 and 240 may be included in the same computer system. Elements 230 and 240 may be physically located in close proximity or at geographically different locations. These and other variations of the example 200 are readily appreciated by one of ordinary skill in the art.

The mirroring driver 206 may capture and record file operations when a file operation has been completed as may be indicated, for example, by the return status of each request as indicated by the arrows going up the return call chain of the elements included in 202. Upon the completion of the file operation, the mirroring driver 206 makes a determination as to whether it should capture the particular file operation. In this example, the file operation may be one of interest if the operation results in a modification to a file such as, for example, in connection with a file creation, a file write operation, a file truncation operation, and the like. It should be noted that other conditions may be associated with defining whether a particular file operation is of interest including, for example, the successful status of a file operation. If the mirroring driver 206 determines that the particular file operation is of interest in accordance with the one or more criteria as may be specified in an embodiment, the data operation may be captured and stored in the kernel cache 210. It should be noted that in this example, the kernel cache may be characterized as an area of shared memory acting as a queue for all mirrored file operations. The kernel cache may be a fixed size. If the kernel cache is full, the file operation may then be recorded in the overflow area 212. In this example, the replication service 214 on the source and the replication service 216 on the target may be characterized as user mode applications and are not required to be executed in a privileged mode, such as kernel mode 202.

In connection with recording the file operations of interest, the mirroring driver 206 produces what may be characterized as a stream of file operations to be applied to the target data included in target device 106. The foregoing describes asynchronous data movement in which the file system changes do not need to be committed to the target before additional data operations to the source data are allowed to continue. Rather, the source system is allowed to operate normally in parallel to the data replication processing. The asynchronous replication used in the foregoing allows for capturing any changes to source data immediately which are then cached locally on a source system. The changes are then forwarded to the target system or server as network and other resources allow.

What will now be described are techniques that may be used in connection with inserting additional consistency point markers in the foregoing stream of recorded file operations. The consistency point markers indicate various points at which a copy of the source data, as may be replicated in the target data, is consistent. In other words, a consistency point marker may be inserted into the stream of file operations to serve as a marking point such that if data operations up to that particular marker are applied to the target device, the target device may be characterized as a consistent point in time copy of the source data. In one embodiment as will be described herein with reference to the components of FIG. 4, a modified version of the replication service 214 may also be used in connection with inserting a consistency point marker into the stream or queue of the file operations to be applied to the target copy of the data.

It should be noted that RepliStor is a commercially available product by EMC Corporation for use in connection with data replication and mirroring as described herein. The commercially available RepliStor product includes the replication services 214 and 216 and the mirroring driver which operates as described, for example, in connection with the embodiment 200 of FIG. 4. What will now be described is one embodiment in which modified versions of those components as illustrated in FIG. 4 may be used in connection with obtaining a consistent point in time copy of source data on a target. The copy of the source data as included in a target may be used in connection with performing other operations as will be appreciated by those of ordinary skill in the art.

Figure 5:
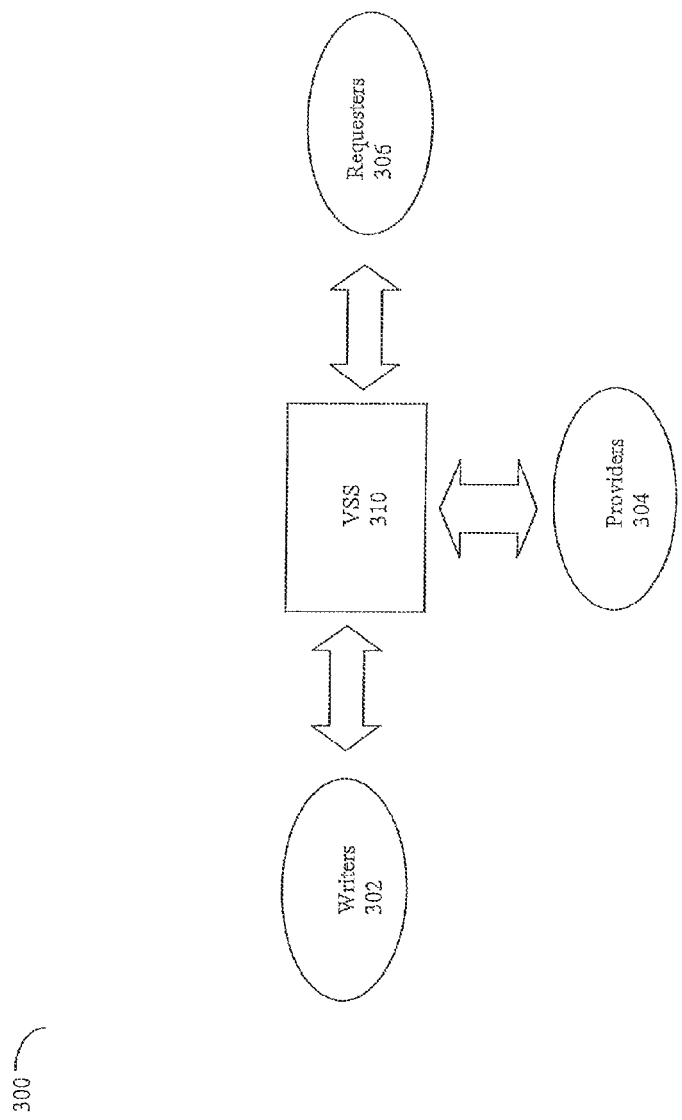
FIG. 5 is an example of components that may be included in a framework used in connection with inserting consistency point markers into a stream of captured file operations.

Referring now to FIG. 5, shown is an example 300 of components that may be included in the framework used in connection with inserting consistency point markers into the stream of file operations captured on a source system. Included in the example 300 are Writers 302, Providers 304, and Requesters 306. Additionally included in the example 300 is a component VSS 310. In this example, VSS 310 is the Volume Shadow Copy Service (VSS) by Microsoft Corporation. VSS is a commercially available product that may be characterized as providing a framework with an application programming interface (API) that may be used in connection with creating consistent point in time copies of data. As more generally used, VSS allows system administrators to create snapshots or shadow copies of a volume of files that may be shared as a network resource. VSS communicates with the different components that may be characterized in different classes as Writers 302, Providers 304, and Requesters 306 with respect to a particular dataset so that a point-in-time copy of the data may be made. Writers 302 may be characterized as a first set of components which write to a copy of data, such as the source data included in the source system 230 of FIG. 4. A writer may be, for example, the database application 102 illustrated in connection with FIGS. 3 and 4, a Microsoft Exchange server, or other application. Generally, Writers 302 may perform updates or other types of operations causing modifications to dataset. Providers 304 may be characterized as software and/or hardware components which provide the dataset such as, for example, the underlying storage system. Providers of the datasets may include, for example, data storage systems such as the Symmetrix data storage system by EMC Corporation or other data storage systems. The Providers 304 generally provide the resource or dataset which may be accessed by the Writers 302. Requesters 306 may be characterized as those components making a request for obtaining a point-in-time copy. In general use, Requesters may include, for example, a backup software application in connection with making a request for performing a backup copy of data as may be provided by one of the Providers 304. In operation, the Requester 306 may issue a request to the VSS component 310 to obtain a point-in-time copy of a dataset. VSS 310 then communicates with the Writers 302 of that dataset to pause any new transactions, finish any current transactions, and flush any cached data to disk. Once the Writers 302 have completed this set of operations with respect to a requested dataset, the VSS component 310 communicates with the appropriate Provider 304 to initiate a shadow copy process for the requested datasets. Once a shadow copy has been created, the backup software (e.g., requester in this instance) can then copy data from this shadow copy, for example, to a tape without involving the writers of the particular dataset. Thus, VSS acts as a framework for facilitating communications between Writers 302, Providers 304, and Requesters 306 in order to obtain a point-in-time copy of data.

The foregoing framework may be used in connection with obtaining a consistent point in time copy of the source data. In connection with the techniques described herein, a host-based user mode process, such as the replication service 214 of the example 200 of FIG. 4, may register as one of the Providers 304 of a dataset, such as the source data. Thus, using the framework of FIG. 4, the replication service 214 may register as a provider and be notified by VSS 310 when a requested dataset (e.g., the source data) is in a consistent state. A process may initiate a request as one of the Requesters 306 using an application programming interface (API) when generation of a consistency point marker is desired. It should be noted that the process or component acting as the Requester and the Provider for the consistency point marker generation may be the same process or component as well as different processes or components. The API may be specified in accordance with the particular embodiment such as the VSS and other components.

As an example, a scheduler may be a process which executes in the source system and makes a request as a Requester 306 for the source data. The replication service 214 may be registered as a Provider 304 for the source data. VSS 310 communicates with the database application and any other Writers 302 of the source data to complete existing transactions, not start any new ones, and flush any cached source data so that the source data is in a consistent state. VSS 310 then notifies the registered Providers 304 of the source data which causes notification to be sent to the service 214 that the source data is currently in a consistent state. Any further operations to the source data are paused for a predetermined small time period. The service 214 may then generate a consistency point marker as a next element in the stream of captured file operations for the source data. The various Writers 302 of the source data may then resume normal operations in connection with the source data.

Figure 6:
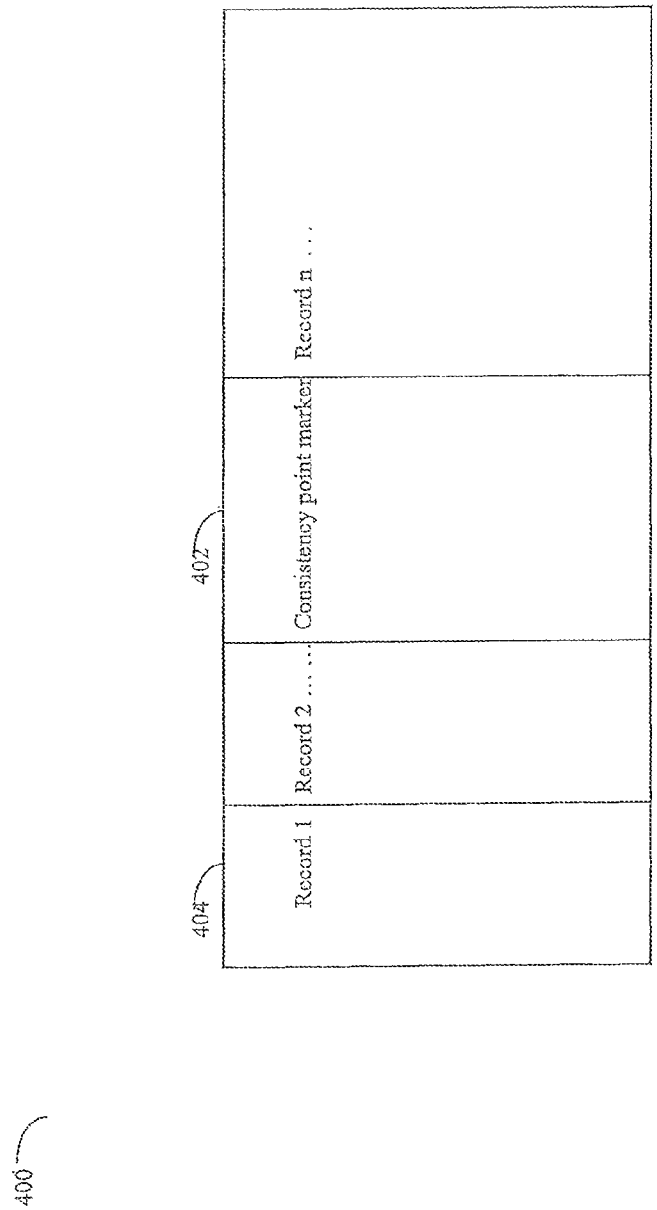
FIG. 6 is an example of a stream of captured file operations.

Referring now to FIG. 6, shown is an example of an embodiment of a stream of captured file operations as may be stored, for example, in the kernel cache 210. Included in the example 400 is a list of records. Each record corresponds to either a particular file operation that has been captured, as with record 404, or to a consistency point marker, such as record 402. The data included in each captured file operation record 404 may include, for example, a particular file name, location, data value and the like, in accordance with the particular file operation. The consistency point marker record 402 may be a special record written into the stream of file operations. An example of an embodiment of the data elements that may be included in a consistency point marker record 402 are described in more detail in following paragraphs.

Referring now to FIG. 7, shown is an example of elements that may be included in a consistency point marker record 402. In the example 402 of FIG. 7, a consistency point marker record may include a pause forwarding flag 404, a pause update flag 406, an identifier for a source script 408, an identifier for a target script 410, and other data 412. In one embodiment, the fields 404 and 408 may be used in connection with processing consistency point markers on the source system, and fields 406 and 410 may be used in connection with processing consistency point markers on the target system.

The service 214 on the source system may examine and perform processing in accordance with the particular records in the kernel cache. When a record corresponds to a consistency point marker, special processing may be performed using the values of fields 404 and 408. Field 408 may specify a script that is executed on the source system when the consistency point marker record 402 is detected. This script may include processing steps which examine and perform processing in accordance with the value of the pause forwarding flag 404. The pause forwarding flag 404 may be a binary value used in connection with processing the stream of captured file operations on the source system. In one embodiment, if the pause forwarding flag 404 is set (e.g., =1), the flag 404 indicates that records corresponding to the captured file operations should not be sent from the source to the target system causing, for example, a backlog of the file operations to be stored on the source system rather than on a target system. If the pause forwarding flag 404 is off (e.g., =0), it indicates that the records corresponding to the captured file operations should be forwarded to the target system from the source system such that any backlog or build-up of data would occur on the target system rather than the source system. The pause forwarding flag 404 may be used in processing steps by a source script as may be indicated by field 408. It should be noted that the source script field 408 is optional in that a value may unspecified for an instance of the record 402 in which case no script is executed and the pause forwarding flag value may be ignored. In this case, file operations may be forwarded to the target system in effect as if the flag 402 has a value of 0. In one embodiment, the flag 404 may cause the records to queue up on the source system for a predetermined time period. After this predetermined time period, the replication service 214 may then resume processing and forwarding records to the target system. In another embodiment, the script may include processing steps causing forwarding of the records to the target system to cease until the occurrence of a particular event. When this particular event has occurred, the service 214 may be signaled to resume processing of the records.

Processing may also be performed on the target system by the service 216 for the received records of 400 forwarded from the source system. Upon detection of record corresponding to a consistency point marker, special processing may be performed which may use the values of fields 406 and 410. The pause update flag 406 may be a binary value, having the value of 1 when the application of file operations captured should be paused or not applied to a target copy of the data on the target system. Otherwise, the pause update flag, having a value of 0 indicates that the captured file operations as indicated by the transmitted records of 400 should be applied to the target copy of the data. Flag 406 may be used in connection with processing performed by a target system script as may be indicated by field 410. Field 410 may optionally identify a script to be executed on the target system. A record for a particular consistency point marker may also be unspecified in which case the value of flag 406 may be ignored in connection with target system processing. The fields 408 and 410 may include identifiers such as, for example, a directory location and file name containing a script to be executed on the respective source or target system.

It should be noted that an embodiment may include additional fields that may be used in connection with processing the records on the source and/or target systems.

In one embodiment, the replication service 214 of the source system may create each instance of the record 402 and accordingly initialize the fields of the record 402. As an example, if a backup is to be performed every day using a copy of the target data, a scheduler process on the source system may initiate a request to generate a consistency point marker at each 24-hour interval. The particular values of the corresponding consistency point marker record may refer to the scripts for this operation. In addition to generation of markers for the backup operation consistent copy of the source data, additional requests for marker generation may be performed at predetermined time intervals or upon the occurrence of certain events in connection with other operations. As such, the service creating the records for the consistency point markers may accordingly initialize the fields, such as the script fields 408 and 410, with the particular scripts for the respective operations. Similarly, the service 214 generating the records 402 may also initialize other fields of each record instance in accordance with the particular operation to be performed.

Figure 8:
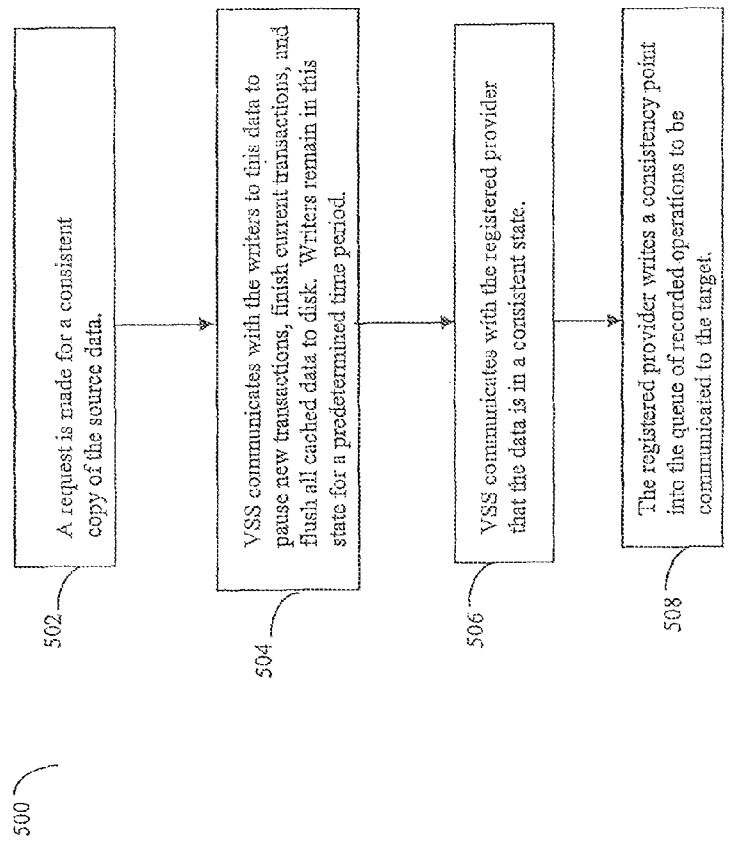
FIG. 8 is a flowchart of processing steps that may be performed in connection with determining when the source data is in a consistent state.

Referring now to FIG. 8, shown is a flowchart 500 of processing steps that may be performed in an embodiment in connection with determining when the source data is in a consistent state. The steps of 500 summarize the processing described above, for example, in connection with FIG. 5. At step 502, a request is made to obtain a consistent copy of the source data. Such a request may be made, for example, in connection with performing periodic backup operations by a scheduler task, and the like. At step 504, the VSS component communicates with the writers to the source data to pause new transactions, finish current transactions, and flush all cached data to disk. The writers may pause at this state for a predetermined period of time. VSS then communicates with the registered provider of the source data that the data is in a consistent state. In this example, the provider may be, for example, the replication service 214 of FIG. 4. At step 508, the registered provider writes a record corresponding to a consistency point marker into the queue of recorded operations to be processed for forwarding to the target system.

Figure 9:
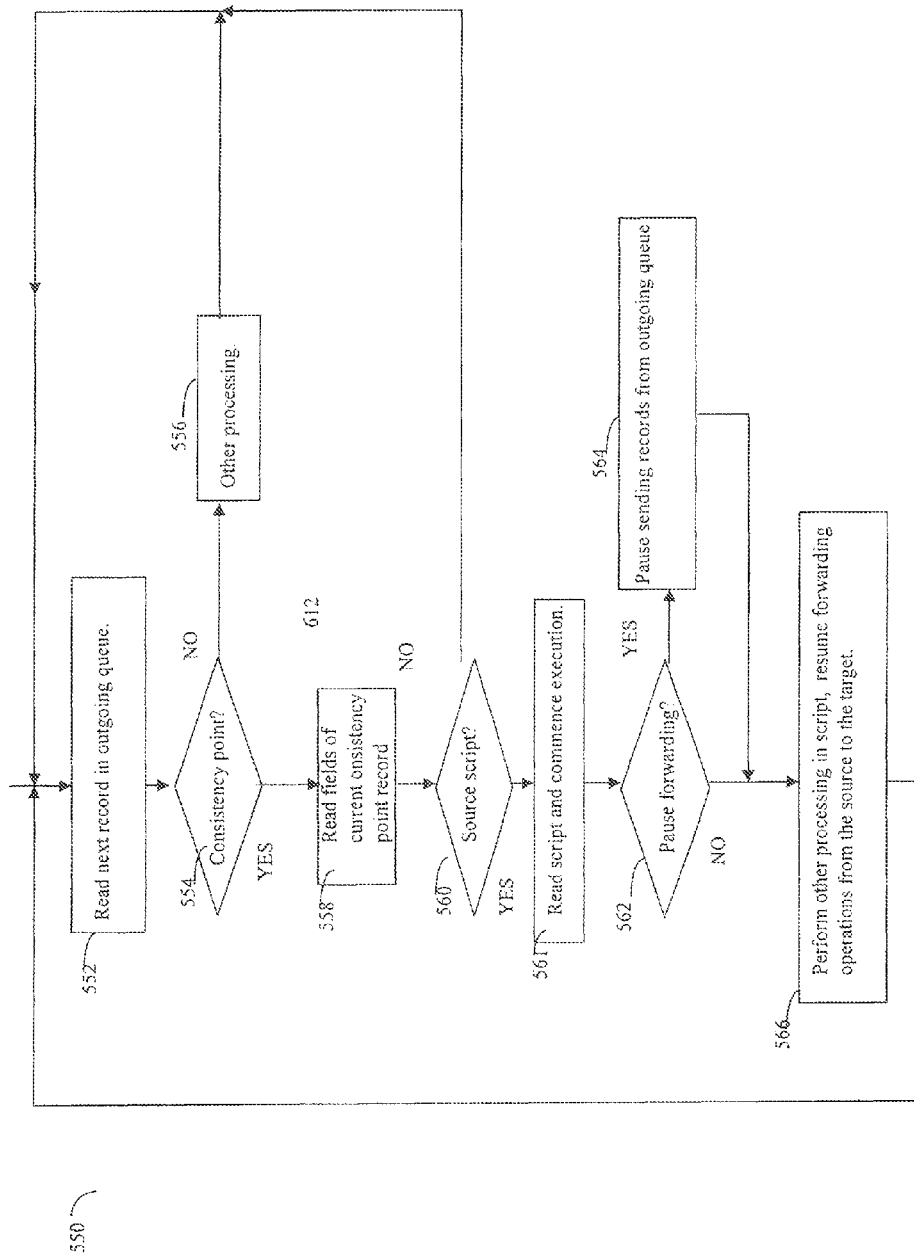
FIG. 9 is a flowchart of processing steps that may be performed by a source system in connection with processing records corresponding to captured file operations and consistency point markers being forwarded to a target system.

Referring now to FIG. 9, shown is a flowchart of processing steps that may be performed in an embodiment by a source system in connection with processing records from the outgoing queue of records to be forwarded to the target system. As described elsewhere herein with reference to elements of FIG. 4, these records may be stored in the kernel cache and/or overflow location. At step 552, the next record in the outgoing queue is read. At step 554, a determination is made as to whether this record corresponds to a consistency point marker. If not, control proceeds to step 556 to perform other processing. It should be noted that the other processing of step 556 may include steps for forwarding the record to the target system as described elsewhere herein. Additionally, an embodiment may also perform other processing steps in accordance with the different file operations and other fields included in each record than as described herein. Control then proceeds to step 552 to read the next record. If step 554 evaluates to yes, control proceeds to step 558 where the fields of the current record are read. A determination at step 560 is made as to whether a source script is specified. If not, control proceeds to step 552 to continue processing with the next record. If step 560 evaluates to yes indicating that a source script has been specified, the source script is obtained at step 561 and execution of the script is performed. Included in this example of the source script are statements using the pause forwarding flag and conditionally performing processing steps based on the flag's value. In other words, in this example, the source script includes statements for performing steps 562, 564 and 566. At step 562, a determination is made as to whether the pause forwarding flag is set. If so, control proceeds to step 564 where the source system pauses any further sending of records in the outgoing queue to the target system. If step 562 evaluates to no, then no pause is made in connection with forwarding further records from the outgoing queue to the target system. Control proceeds to step 566 where other processing steps may be performed in accordance with the source script. In this example, the source script may specify that forwarding of records from the outgoing queue may be resumed if previously paused. It should also be noted that variations to the foregoing may be specified in a script. Control proceeds to step 552 with processing of the next record in the outgoing queue. The steps of flowchart 550 may be performed by the replication service 214 of the source system and a source system script.

Figure 10:
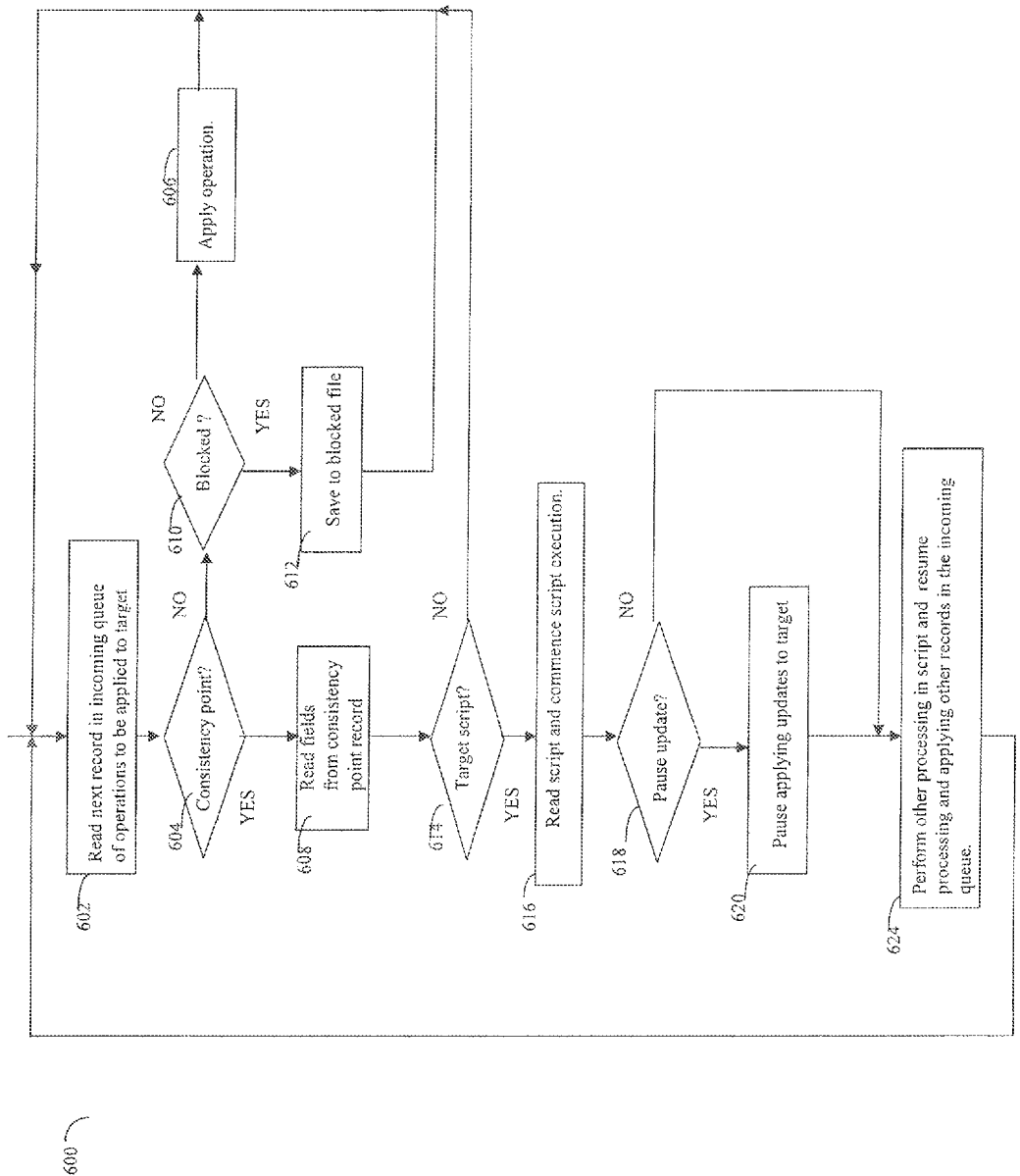
FIG. 10 is flowchart of processing steps that may be performed by a target system in connection with processing records corresponding to captured file operations and consistency point markers received from a source system.

Referring now to FIG. 10, shown is a flowchart of processing steps that may be performed in an embodiment by a target system in connection with processing records received from the source system. At step 602, the next record in the incoming queue is read. At step 604, a determination is made as to whether this record corresponds to a consistency point marker. If not, control proceeds to step 610 to determine if this is a file operation to be applied to a file which is already in a blocked state. If not, control proceeds to step 606 to apply the operation to the target data. After step 606, control proceeds to step 602 to process the next record in the incoming queue. Otherwise, if the file operation is to be applied to a file which is in a blocked state, control proceeds to step 612 to save the record in a saved block file, such as element 220 of FIG. 4. As described elsewhere herein, at some later point when the particular file is no longer in a blocked state, the blocked file operations may be applied to the target data. After step 612, control proceeds to step 602 to process the next record in the incoming queue. If step 604 determines that the current record corresponds to a consistency point marker, control proceeds to step 608 to read the fields of the current record. At step 614, a determination is made as to whether a target script is specified. If not, control proceeds to step 602. Otherwise, control proceeds to step 616 to read the script and begin execution of the script. Included in this example of the target script are statements using the pause applying updates flag and conditionally performing processing steps based on the flag's value. In other words, in this example, the target script includes statements for performing steps 618, 620 and 624. At step 618, a determination is made as to whether the pause applying updates flag is set. If not, control proceeds to step 624. Otherwise, control proceeds to step 620 to pause processing any further records in the incoming queue and thus pause applying any further file operations as may be indicated by the records. At step 624, additional processing may be performed in accordance with the script and the script may cause processing of records in the incoming queue to resume if previously paused at step 620. Processing at step 624 in accordance with the script may include, for example, performing a backup of the target data or performing a split of the target data while the target system is currently pausing the application of any further updates to the target data. Subsequently, after the backup or other operation is performed, the target system may resume processing of records in the incoming queue. It should also be noted that variations to the foregoing may be specified in a script. Control proceeds to step 602 to process the next record. The steps of flowchart 600 may be performed by the replication service 216 of the target system and a target system script.

The foregoing describes an embodiment using VSS. However, an embodiment may use other techniques in connection with coordinating the communication between the components accessing a particular data set without using VSS. For example, an embodiment may use scripts and/or other programming techniques as an alternative to VSS.

It should be noted that the components of FIG. 4, as modified to include the functionality for obtaining and utilizing the consistency point markers, may be included in any one of a variety of different configurations. For example, a first configuration may include the components of the source 230 on a host. The replication service 214 of the source may reside and execute in a host. The data source, device 104, may be local to the host or otherwise connected to the host. One configuration of the target 240 may include a target host upon which the replication service 216 resides and executes. The target device 106 may be local to the target host or otherwise connected to the target host. The foregoing may be characterized as a host-to-host based communication system and the replication services, mirroring drivers and other components used in connection with the techniques described herein reside on host systems. Some of the components used in connection with the techniques described herein may also reside and be executed within data storage systems. For example, an embodiment of the target system 240 may include a target data storage system, such as a Symmetrix or Clarion data storage system, upon which the replication service 216 resides and executes thereon. The source system 230 may include a host which communicates with the target data storage system using appropriate communication connections. In another embodiment, the source system 230 may include a source host, upon which an application 102 executes and upon which the mirroring driver 206 executes. The source system 230 may also include a source data storage system upon which the replication service 214 executes and communicates with the source host to obtain the recorded file operations and markers from 210 and 212. The source data storage system of 230 may communicate with the target 240 (using host-based or data storage-based communications as appropriate for the target 240) in connection with the techniques described herein. What will now be illustrated are some examples of the different configurations that may be used in connection with the foregoing techniques.

Figure 11:
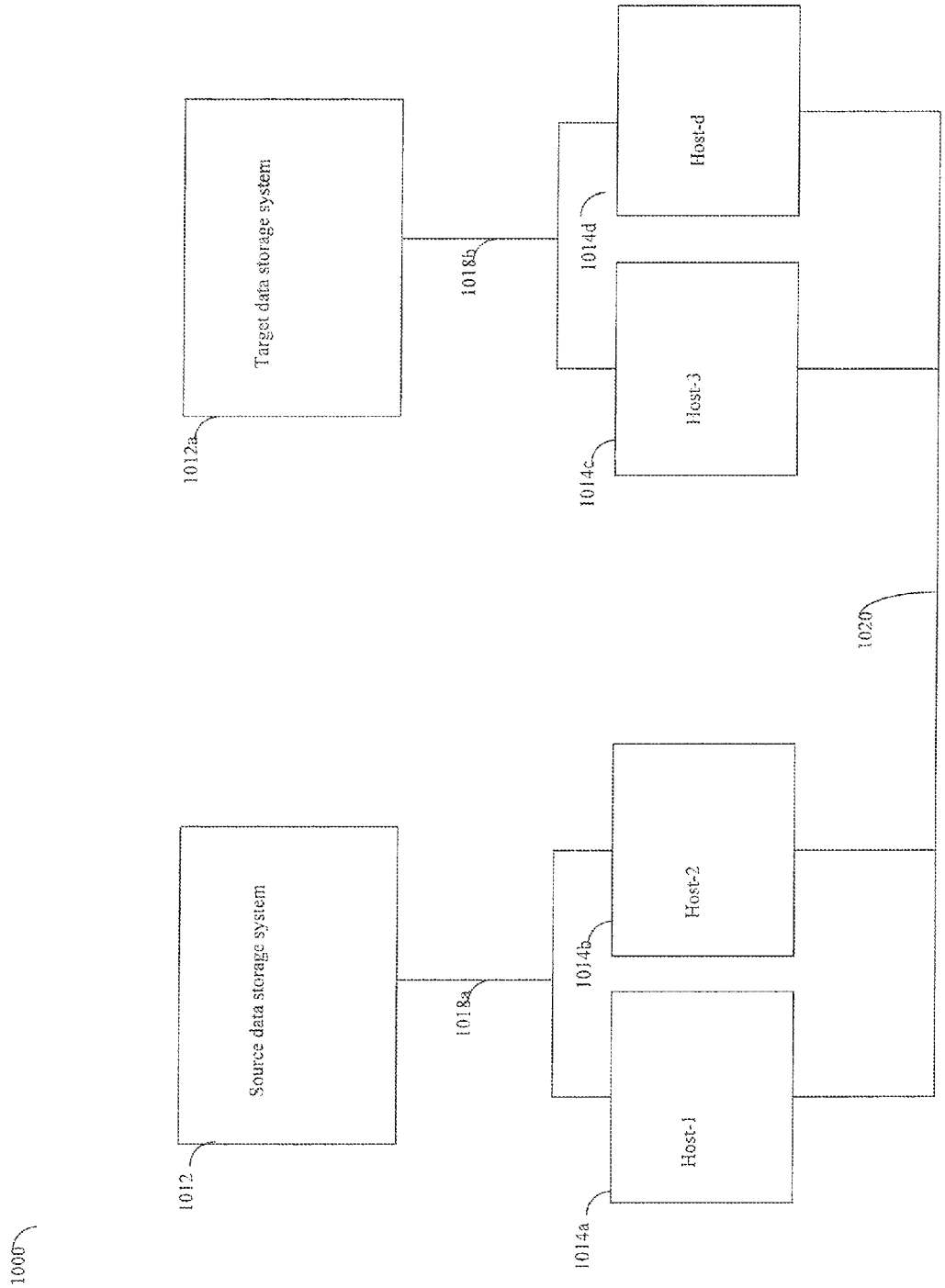
FIGS. 11 and 12 are examples illustrating other configurations in which the techniques and components described herein may be utilized.

Referring now to FIG. 11, shown is an example 1000 illustrating a configuration in which the components and techniques described herein may be used. The example 1000 includes source data storage system 1012 connected to two source hosts, 1014*a-b*. The two hosts 1014*a-b* may communicate with target hosts 1014*c-d* using communication medium 1020. The two source hosts 1014*a-b* may communicate with each other and the source data storage system 1012 over communication medium 1018*a*. Similarly, the target hosts 1014*c-d* may communicate with each other and target data storage system 1012*a* over communication medium 1018*b*. The foregoing may be characterized as a host-to-host based communication using the techniques described herein where the components of the source 230 and target 240 used to perform the processing steps described herein reside and execute on respective source and target host systems. The foregoing example 1000 also illustrates the distributive nature of the data storage systems as may also exist in an embodiment. The source and target data storage systems may be, for example, as described in connection with FIG. 2.

Figure 12:
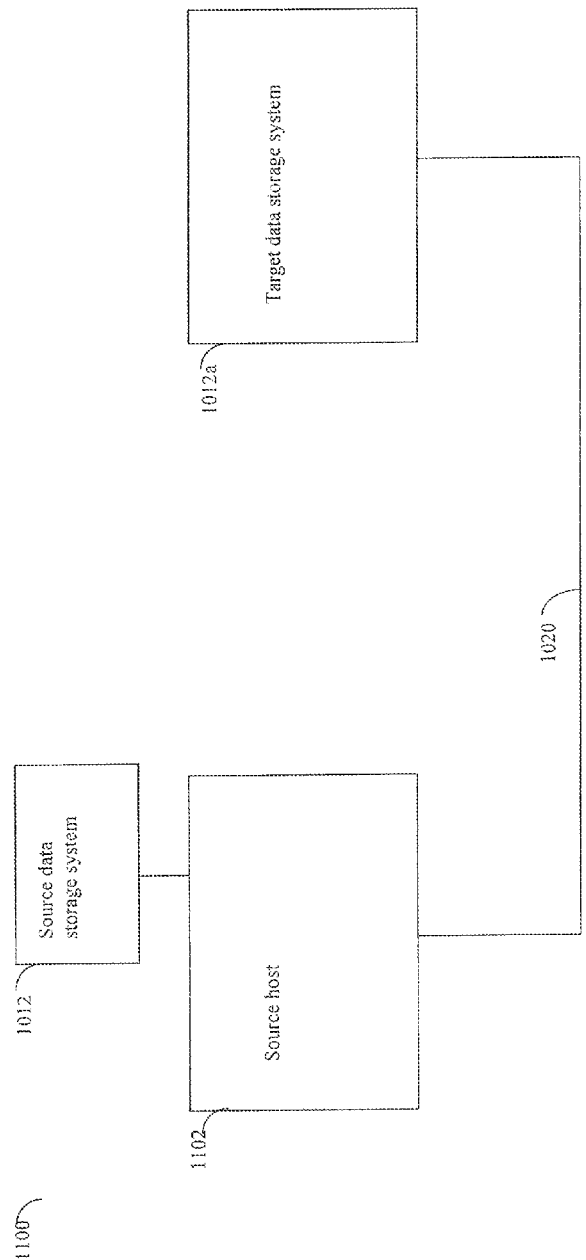

Referring now to FIG. 12, shown is an example 1100 illustrating another configuration in which the components and techniques described herein may be used. In the example 1100, the source host 1102 communicates with a target data storage system 1012*a*. The target data storage system 1012*a* may include one or more data storage systems, such as Symmetrix or Clarion data storage systems, with which the source host 1102 communicates over 1020. The source host 1102 may obtain the source data from the source data storage system 1012. The source data storage system 1012 may be as described, for example, in connection with FIG. 2.

Figure 13:
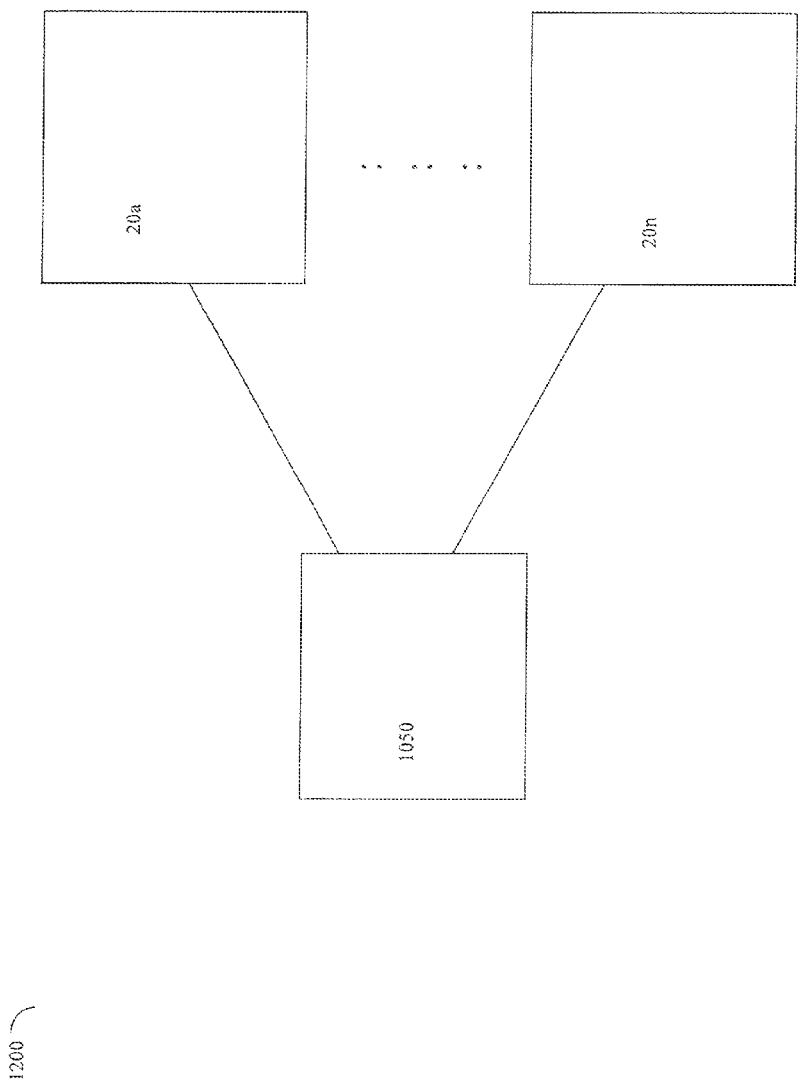
FIG. 13 is an example illustrating in more detail a data storage system configuration that may be used in connection with the techniques described herein.

Referring now to FIG. 13, shown is an example 1200 illustrating another configuration of components that may be included in the source and/or target data storage systems. In particular, the example 1200 may be a configuration for a target data storage system of FIG. 12. The example 1200 includes a component 1050 that may be characterized as a front end processor or computer used to facilitate communications to/from one or more data storage systems 20*a*-20*n* through a common point. The component 1050 may be, for example, a server system as may be included in a SAN (storage area network), or other processor used to facilitate communications with components 20*a*-20*n*. With reference to the components of FIG. 4 as may be modified in accordance with the techniques described herein using consistency markers, in an embodiment in which the example 1200 is a target system, the replication service 216 may reside and be executed on component 1050.

FIGS. 11-13 are some examples selected to illustrate the different configurations that may be included in an embodiment using the techniques described herein. Other variations will be appreciated by those of ordinary skill in the art: in connection with host-to-host, data storage-to-host and host-to-data storage based communications using the techniques described herein.

The foregoing describes a technique for passing consistency point markers from a source system to a target system where data is being automatically replicated from source data of the source system to target data of the target system. The source data may be a file system-based element such as a file, directory, and the like. One embodiment as described above may use Microsoft's VSS (Volume Shadow copy Service) framework to obtain consistent "snapshots" of the source data at defined time intervals or consistency points, and to write out associated consistency point markers in the queue of captured file operations to be applied to the copy in the target. The different components may communicate using a defined application programming interface (API). The queue of captured file operations and consistency point markers may be continually sent to the target system where the captured file operations are read and applied to the target data copy until a consistency point marker is reached. At this point, the target system knows that the target data is in a consistent state with respect to a snapshot of the source data. Before applying any more captured file operations from the queue to the target data, the target system may use the consistent copy of the source data as reflected in the target data in connection with performing any one of a variety of tasks, such as a backup operation, a consistent split operation, and the like. Also described herein is a feature that may be used in controlling the stream of captured file operations in the queue as transmitted between the source and target systems. A script may be executed on the source system to control the flow rate at which the file operations and consistency point markers included in an outgoing queue of the source system are sent to the target system (e.g., pause forwarding so as not to send any further updates/writes to the target system). A script may also be executed on the target system to pause applying any further captured file operations to the target data. As such, the target data representing a point in time consistent copy of the source data may be frozen in this consistent state for a length of time so that other operations (e.g., a backup operation, split operation, etc.) can be performed. Rather than use the VSS framework, an alternative embodiment may use scripts or other programming techniques to control the coordination between all registered data writers (e.g., a database application), providers (e.g., data storage systems such as Symmetrix data storage systems), and requestors in order to obtain a consistent snapshot of the data source, and insert consistency point markers in the queue of records of file operations to be applied to the target data as part of data replication. Different components may reside and execute upon hosts and/or data storage systems as also described herein in accordance with different configurations and others that will be appreciated by those of ordinary skill in the art.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer implemented method for capturing file operations applied to a data set comprising:
    recording one or more file operations having a corresponding time sequence and which modify said data set, wherein said recording of each of said file operations is performed by a mirroring driver when said mirroring driver receives a successful completion return status for a request to perform said each file operation, said request issued using a call chain, said mirroring driver included in the call chain above a file system, said successful completion return status being received by the mirroring driver when returning up the call chain after completion of said each file operation;
    receiving a request for a copy of the data set in a consistent state;
    determining at which point in said corresponding time sequence said data set is in a consistent state as a result of applying a portion of said file operations; and
    marking said point in said corresponding time sequence at which said data set is in a consistent state.

2. The method of claim 1, wherein said marking said point in said corresponding time sequence includes:
    determining a corresponding one of said file operations at which said consistent state is obtained.

3. The method of claim 1, further comprising:
    recording said portion of file operations in real time as applied to the data set wherein said portion of file operations are recorded as a time-ordered series of records, each of said records corresponding to one of said file operations in said portion; and
    inserting a marker record into said series of records indicating when said data set is in a consistent state.

4. The method of claim 3, further comprising:
    transmitting records corresponding to said portion of file operations from a system associated with said data set, wherein said transmitting of said records is paused in accordance with processing performed on said system.

5. The method of claim 4, further comprising:
    executing a source script on said system to control transmission of said records to a target.

6. The method of claim 5, wherein said marker record includes an indicator corresponding to at least one of said source script, a target script executed in connection with processing said records after they are transmitted to a target, a first flag value indicating whether to pause application of said portion of file operations to a copy of said data set at said target, a second flag value indicating whether to pause transmission of said records from said system.

7. The method of claim 1, wherein said request for a copy of the data set in a consistent state is made using an application programming interface to a component which coordinates access to said data set, and, in response to receiving said request, said component:
    causes a writer of said data set to complete existing transactions without starting any new transactions and to flush data cache stores of said data set, said writer pausing commencing of new transactions in accordance with at least one criteria;
    communicates with a registered element that said data set is in a consistent state; and
    communicates with said writer to resume new transactions in accordance with said at least one criteria.

8. The method of claim 7, wherein said registered element performs said marking said point in said corresponding time sequence by inserting a marker record into a time-ordered series of records corresponding to said portion of file operations.

9. A computer readable medium comprising code stored thereon for capturing file operations applied to a data set, the computer readable medium comprising code stored thereon for:
recording one or more file operations having a corresponding time sequence and which modify said data set, wherein said recording of each of said file operations is performed by a mirroring driver when said mirroring driver receives a successful completion return status for a request to perform said each file operation, said request issued using a call chain, said mirroring driver included in the call chain above a file system, said successful completion return status being received by the mirroring driver when returning up the call chain after completion of said each file operation;
receiving a request for a copy of the data set in a consistent state;
determining at which point in said corresponding time sequence said data set is in a consistent state as a result of applying a portion of said file operations; and
marking said point in said corresponding time sequence at which said data set is in a consistent state.

10. The computer readable medium of claim 9, wherein said code for marking said point in said corresponding time sequence includes code for:
determining a corresponding one of said file operations at which said consistent state is obtained.

11. The computer readable medium of claim 9, further comprising code for:
recording said portion of file operations in real time as applied to the data set wherein said portion of file operations are recorded as a time-ordered series of records, each of said records corresponding to one of said file operations in said portion; and
inserting a marker record into said series of records indicating when said data set is in a consistent state.

12. The computer readable medium of claim 11, further comprising code for:
transmitting records corresponding to said portion of file operations from a system associated, with said data set, wherein said transmitting of said records is paused in accordance with processing performed on said system.

13. The computer readable medium of claim 12, further comprising code for:
executing a source script on said system to control transmission of said records to a target.

14. The computer readable medium of claim 13, wherein said marker record includes an indicator corresponding to at least one of: said source script, a target script executed in connection with processing said records after they are transmitted to a target, a first flag value indicating whether to pause application of said portion of file operations to a copy of said data set at said target, a second flag value indicating whether to pause transmission of said records from said system.

15. The computer readable medium of claim 9, wherein said request for a copy of the data set in a consistent state is made using an application programming interface to a component which coordinates access to said data set, and, in response to receiving said request, said component comprising code stored on a computer readable medium that:
causes a writer of said data set to complete existing transactions without starting any new transactions and to flush data cache stores of said data set, said writer pausing commencing of new transactions in accordance with at least one criteria;
communicates with a registered element that said data set is in a consistent state; and
communicates with said writer to resume new transactions in accordance with said at least one criteria.

16. The computer readable medium of claim 15, wherein said registered element performs said marking said point in said corresponding time sequence by inserting a marker record into a time-ordered series of records corresponding to said portion of file operations.

* * * * *